US 6,617,782 B2

(12) United States Patent
Cheong et al.

(10) Patent No.: US 6,617,782 B2
(45) Date of Patent: Sep. 9, 2003

(54) THIOALUMINATE PHOSPHOR MATERIAL WITH A GADOLINIUM CO-ACTIVATOR

(75) Inventors: Dan Daeweon Cheong, Mississuaga (CA); M. Abdul Nakua, Mississuaga (CA)

(73) Assignee: iFIRE Technology Inc., Fort Saskatchewan (CA)

( * ) Notice: Subject to any disclaimer, the term of this patent is extended or adjusted under 35 U.S.C. 154(b) by 0 days.

(21) Appl. No.: 09/867,806

(22) Filed: May 30, 2001

(65) Prior Publication Data

US 2002/0180346 A1 Dec. 5, 2002

(51) Int. Cl.$^7$ .............. H01J 1/62; H01J 63/04; H01J 1/63; C09K 11/00
(52) U.S. Cl. .............. 313/503; 313/485; 313/486; 252/301.45; 252/301.65
(58) Field of Search .............. 313/485, 486, 313/487, 503; 252/301.4 R, 301.4 S, 301.6 R, 301.6 S

(56) References Cited

U.S. PATENT DOCUMENTS

| 4,967,251 | A | | 10/1990 | Tanaka et al. | |
| 5,432,015 | A | | 7/1995 | Wu et al. | |
| 5,543,237 | A | | 8/1996 | Watanabe | |
| 5,625,255 | A | | 4/1997 | Watanabe | |
| 5,670,839 | A | | 9/1997 | Noma et al. | |
| 6,025,677 | A | * | 2/2000 | Moss, III et al. | 313/503 |
| 6,153,123 | A | * | 11/2000 | Hampden-Smith et al. | 252/301.45 |
| 6,168,892 | B1 | * | 1/2001 | Ohara et al. | 430/45 |

FOREIGN PATENT DOCUMENTS

| DE | 100 28 266 A1 | 12/2001 |
| WO | WO 00/70917 | 11/2000 |

OTHER PUBLICATIONS

PCT/CA 02/00690—Notification of Transmittal of the International Search Report or the Declaration.
International Application Published Under the Patent Cooperation Treaty (PCT)—International Publication No. WO 02/23957 A1.

* cited by examiner

Primary Examiner—Ashok Patel
Assistant Examiner—Jason R Phinney
(74) Attorney, Agent, or Firm—Fay, Sharpe, Fagan, Minnich & McKee, LLP

(57) ABSTRACT

A thin film phosphor for an electroluminescent device, in which the phosphor is selected from the group consisting of thioaluminates, thiogallates and thioindates having at least one cation selected from elements of Groups IIA and IIB of the Periodic Table of Elements. The phosphor is activated by a rare earth metal and co-activated with gadolinium. The phosphor provides improved luminance. An electroluminescent device comprising the thin film phosphor on a substrate is also described. Further aspects provide an electroluminescent device in which the thin film phosphor is adjacent to a thin film of zinc sulphide, preferably sandwiched between thin films of zinc sulphide.

35 Claims, 8 Drawing Sheets

THIOALUMINATE PHOSPHOR MATERIAL WITH A GADOLINIUM CO-ACTIVATOR

FIELD OF THE INVENTION

The present invention relates to alkaline earth thioaluminate phosphor materials that contain gadolinium as a co-activator. In particular, the present invention relates to the use of gadolinium as co-activator for such phosphors when deposited as thin films in electroluminescent displays. The present invention also relates to improving the luminance of phosphor materials used for full colour ac electroluminescent displays, particularly those employing thick film dielectric layers with a high dielectric constant.

BACKGROUND OF THE INVENTION

Thick film dielectric structures provide for superior resistance to dielectric breakdown, as well as a reduced operating voltage, compared to thin film electroluminescent (TFEL) displays e.g. as exemplified by U.S. Pat. No. 5,432,015. The thick film dielectric structure when it is deposited on a ceramic substrate will withstand higher processing temperatures than TFEL devices, which are typically fabricated on glass substrates. This increased high temperature tolerance facilitates annealing of phosphor films at higher temperatures to improve their luminosity. With these advantages and with recent advances in blue-emitting phosphor materials, displays have approached the luminosity and colour coordinates required to achieve the technical performance of traditional cathode ray tube (CRT) displays. Nevertheless, further improvement in green and blue phosphor performance is required to simplify display design, to improve display reliability by lowering operating voltages and to keep pace with a trend towards higher colour temperature specifications for displays.

Traditionally, the phosphor materials of choice for full colour electroluminescent displays have been cerium-activated strontium sulphide for blue and manganese-activated zinc sulphide for red and green colours. The optical emission from these phosphor materials must be passed through an appropriate chromatic filter to achieve the necessary colour coordinates for red, green and blue sub-pixels, resulting in a loss of luminance and energy efficiency. The manganese-activated zinc sulphide phosphor has a relatively high electrical to optical energy conversion efficiency of up to about 10 lumens per watt of input power. Cerium-activated strontium sulphide phosphor has an energy conversion efficiency of 1 lumen per watt, which is relatively high for blue emission. However, the spectral emission for these phosphors is quite wide, with spectral emission for the zinc sulphide-based phosphor material spanning the colour spectrum from green to red and that for the strontium sulphide-based material spanning the range from blue to green. This necessitates the use of the optical filters. The spectral emission of the cerium-activated strontium sulphide phosphor can be shifted to some degree towards the blue by controlling the deposition conditions and activator concentration, but not to the extent required to eliminate the need for an optical filter.

Alternate blue phosphor materials that have narrower emission spectra tuned to provide the colour coordinates required for a blue sub-pixel have been evaluated. The materials include cerium-activated alkaline earth thiogallate compounds, which give good blue colour coordinates, but have relatively poor luminosity and stability. Higher luminosity and excellent colour coordinates for blue pixels have been achieved with europium-activated barium thioaluminate phosphor materials. Higher luminosity and excellent colour coordinates for green pixels have been achieved with europium-activated calcium thioaluminate phosphor materials.

The use of gadolinium as a co-activator to enhance the luminosity of rare earth-activated zinc sulphide phosphor materials in thin film electroluminescent devices is known. In particular, U.S. Pat. No. 4,967,251 teaches the use of a red light emitting samarium-activated zinc sulphide phosphor layer in a thin film electroluminescent device. Co-doping of the phosphor material with less than 2 atomic percent of gadolinium resulted in the luminosity being increased by about two-fold. Use of a gadolinium co-activated thulium-activated zinc sulphide phosphor for blue light emission was also described. However, even with the co-activator, the blue luminance was insufficient for use in commercial electroluminescent displays.

Gadolinium is known to function as an activator for the emission of ultraviolet light in a zinc magnesium sulphide phosphor material. For instance, U.S. Pat. No. 5,670,839 teaches an electroluminescent device with a gadolinium-activated $Zn_{1-x}Mg_xS$ phosphor layer where $0.33<x<1$. The phosphor emits ultraviolet light with a wavelength of 310 nanometers. The zinc magnesium sulphide material is said to have a sufficiently large band gap that it does not absorb the ultraviolet light generated by the gadolinium activator. Use of such an ultraviolet emitting phosphor in conjunction with a second adjacent phosphor film that can be photostimulated by the ultraviolet light to emit visible light and thereby create a display is also disclosed. The visible light emitting activators were in a different material from the gadolinium activators.

SUMMARY OF THE INVENTION

One aspect of the present invention provides a thin film phosphor for an electroluminescent device, said phosphor being selected from the group consisting of thioaluminates, thiogallates and thioindates having at least one cation selected from elements of Groups IIA and IIB of the Periodic Table of Elements, said phosphor being activated by a rare earth metal and co-activated with gadolinium.

In a preferred embodiment of the present invention, the phosphor is a thioaluminate.

In another embodiment, said rare earth metal is europium or cerium, especially europium.

In another preferred embodiment, the cation is calcium.

In further embodiments, the phosphor contains europium in an amount in the range of 1 to 10 atomic percent and gadolinium in an amount in the range of 1 to 5 atomic percent. Preferably, the amount of europium is between two and eight percent and the amount of gadolinium is between two and four atomic percent.

Aspects of the present invention also provide an electroluminescent device comprising a thin film phosphor as described herein on a substrate.

Further aspects of the present invention provide an electroluminescent device in which the thin film phosphor is adjacent to a thin film of zinc sulphide. Preferably, the thin film phosphor is sandwiched between thin films of zinc sulphide.

BRIEF DESCRIPTION OF THE DRAWINGS

The present invention will be described with reference to the embodiments shown in the drawings, in which.

DETAILED DESCRIPTION OF THE INVENTION

The present invention relates to gadolinium as a co-activator in alkaline earth thioaluminate phosphors, and especially to the incorporation of gadolinium as a co-activator in such phosphors when they are deposited as thin films in electroluminescent displays. In embodiments, and as exemplified herein, the electroluminance of europium-activated calcium thioaluminate, a green emitting phosphor, is increased by a factor of about two when it is co-doped with about three atomic percent of gadolinium. The CIE colour coordinates of the phosphor are relatively unaffected by the addition of gadolinium as co-activator. Further aspects of the invention relate to the encapsulation of the gadolinium co-doped thin film phosphors between thin films of zinc sulphide to further improve performance. As exemplified, the zinc sulphide layers increase the slope of the luminescence versus voltage curve for electroluminescent devices as compared to similar devices having the same phosphor at the same thickness but without the zinc sulphide layers.

The present invention is particularly directed to use of gadolinium co-activator and a rare earth activator in an alkaline earth thioaluminate host material to form a phosphor. It is believed that the invention is applicable to ternary, quaternary and higher thioaluminate, thiogallate and thioindate phosphors, and composites thereof synthesized, with cation(s) for these compounds selected from Groups IIA and IIB of the Periodic Table of Elements. Examples of such cations include barium, calcium, strontium, magnesium and zinc. A variety of rare earth activators may be used in conjunction with gadolinium in the phosphors, especially europium and cerium. The preferred activator used in conjunction with gadolinium is europium. In preferred embodiments of the invention, gadolinium is used as co-activator of calcium thioaluminate ($CaAl_2S_4$) phosphors, which emit green light. In embodiments of the invention, the activator is europium in amounts of 1–10 atomic percent, preferably 2–8 atomic percent, and the amount of gadolinium used as co-activator is 1–5 atomic percent and preferably 2–4 atomic percent, especially with calcium thioaluminate as the phosphor.

Figure 1:
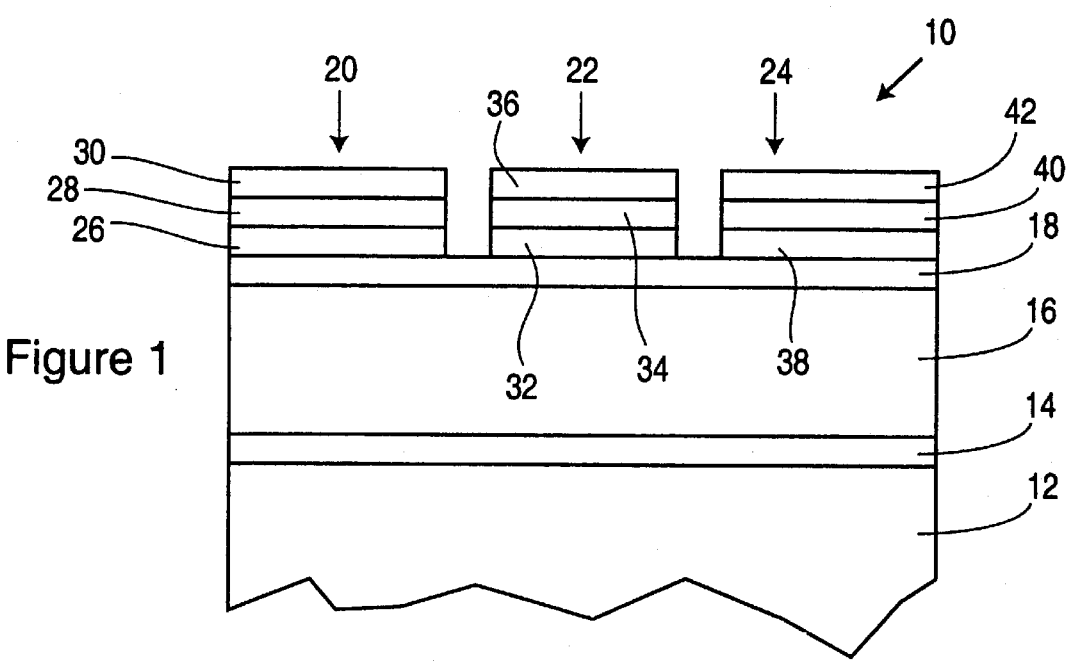
FIG. 1 is a schematic representation of a section of an electroluminescent element comprising a thick film dielectric layer and a phosphor composition typical of the present invention.
Figure 2:
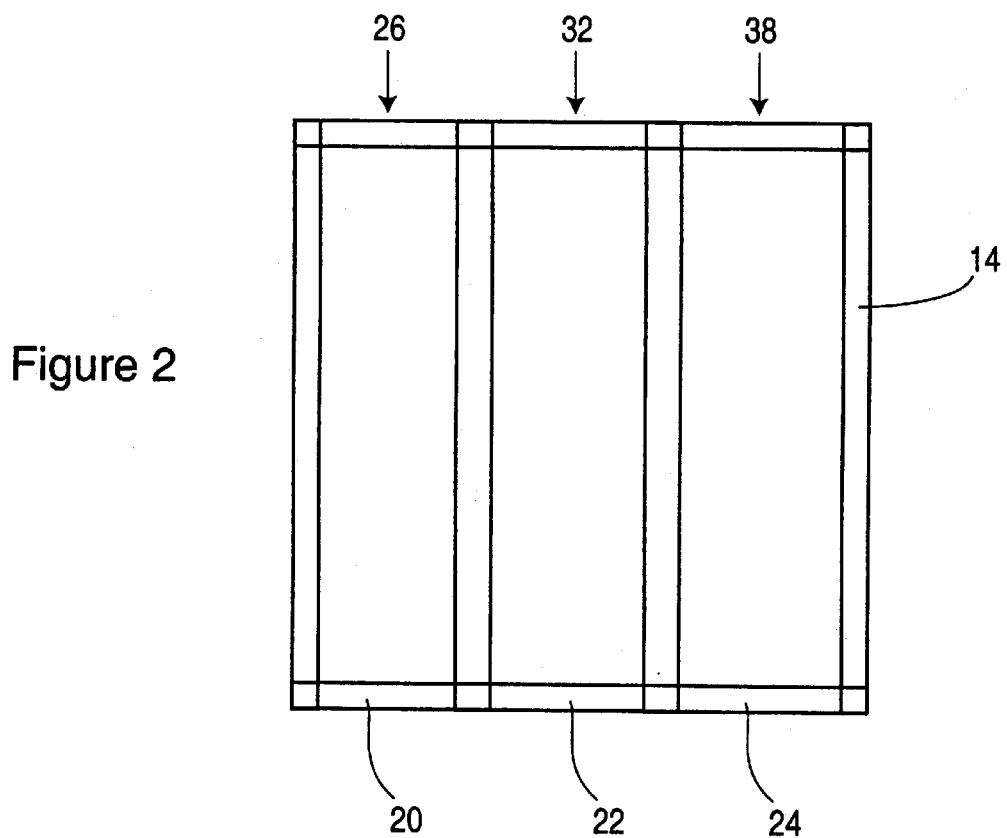
FIG. 2 is a schematic representation of a plan view of a full colour electroluminescent pixel and its constituent sub-pixels.

The present invention is further illustrated by the embodiment shown in FIGS. 1 and 2. FIG. 1 shows a cross-section of an electroluminescent device utilizing a phosphor of the present invention. FIG. 2 shows a plan view of the electroluminescent device. The electroluminescent device, generally indicated by 10, has a substrate 12 on which is located row electrode 14. Thick film dielectric 16 has thin film dielectric 18 thereon. Thin film dielectric 18 is shown with three pixel columns, referred to as 20, 22 and 24, located thereon. The pixel columns contain phosphors to provide the three basic colours viz. red, green and blue. Pixel column 20 has red phosphor 26 located in contact with thin film dielectric 18. Another thin film dielectric 28 is located on red phosphor 26, and column electrode 30 is located on thin film dielectric 28. Similarly, pixel column 22 has green phosphor 32 on thin film dielectric 18, with thin film dielectric 34 and column electrode 36 thereon. Pixel column 24 has blue phosphor 38 on thin film dielectric 18, with thin film dielectric 40 and column electrode 42 thereon.

A variety of substrates may be used, as will be understood by persons skilled in the art. The preferred substrate is a substrate that is opaque in the visible and infrared regions of the electromagnetic spectrum. In particular, the substrate is a thick film dielectric layer on a ceramic substrate. Examples of such substrates include alumina, and metal ceramic composites.

The deposition of the composition may be carried out in an atmosphere of $H_2S$, sulphur or other volatile sulphur bearing compounds that will not contaminate the phosphor film as it is deposited if there is a tendency for the deposited compound to be deficient in sulphur. In particular, the deposition is done in a hydrogen sulphide atmosphere so that deposited species in the film can react with sulphide derived from the hydrogen sulphide to adequately saturate the deposited film with sulphide and achieve the desired film composition. However, in some instances, it may be possible to operate the method in a low pressure inert gas atmosphere without $H_2S$.

The deposition can be done by electron beam evaporation, particularly dual source electron beam evaporation as exemplified by U.S. patent application Ser. No. 09/747,315 or by rf magnetron sputtering wherein there is a facility for injecting and exhausting gases including hydrogen sulphide and wherein the deposition substrate has a heating means.

Alkaline earth thioaluminates have been reported to have utility as electroluminescent phosphors, but with low luminosity. It has been found that improved control of the stoichiometry of the host material facilitates an electroluminescent element with higher luminance. It has now been found that the use of gadolinium as a co-activator facilitates an electroluminescent element with still higher luminance.

In further aspects of the invention, the gadolinium co-doped thin film phosphor is located adjacent to a thin film of zinc sulphide. In particularly preferred embodiments, the gadolinium co-doped thin film phosphor is encapsulated or sandwiched between thin films of zinc sulphide. As exemplified, the zinc sulphide layers increase the slope of the luminescence versus voltage curve for electroluminescent devices as compared to similar devices having the same phosphor at the same thickness but without the zinc sulphide layer The present invention is illustrated by the following examples.

EXAMPLE I

A series of europium-doped magnesium calcium thioaluminate powders were prepared by blending powders of calcium sulphide, magnesium sulphide aluminum sulphide, europium sulphide and gadolinium fluoride in various ratios. The calcium magnesium thioaluminate phosphor powders had the nominal composition $Ca_{0.8}Mg_{0.2}Al_2S_4$:x Eu, y Gd, where x is the atomic fraction of europium relative to the sum of the calcium and magnesium content and y is the atomic fraction of gadolinium relative to the sum of the calcium and magnesium content. Samples were prepared with (i) x=0.03 and y=0.01, (ii) x=0.03 and y=0.03, (iii) x=0.07 and y=0.01 and (iv) x=0.07 and y=0.03.

The blended powders were pressed to form pellets with a diameter of 1.3 cm and a height of 0.75 cm. The pellets were annealed in an alumina boat in a nitrogen environment at about 900° C. for 10 minutes. However, the actual temperatures of the pellet may have been lower due to the large thermal loading introduced by the alumina boat.

The photoluminescence spectra of the resultant phosphors were measured using a Model 814 photomultiplier detection system and an A-1010B Arc Lamp xenon flash lamp from Photon Technology International of London, Ontario, Canada.

Figure 3:
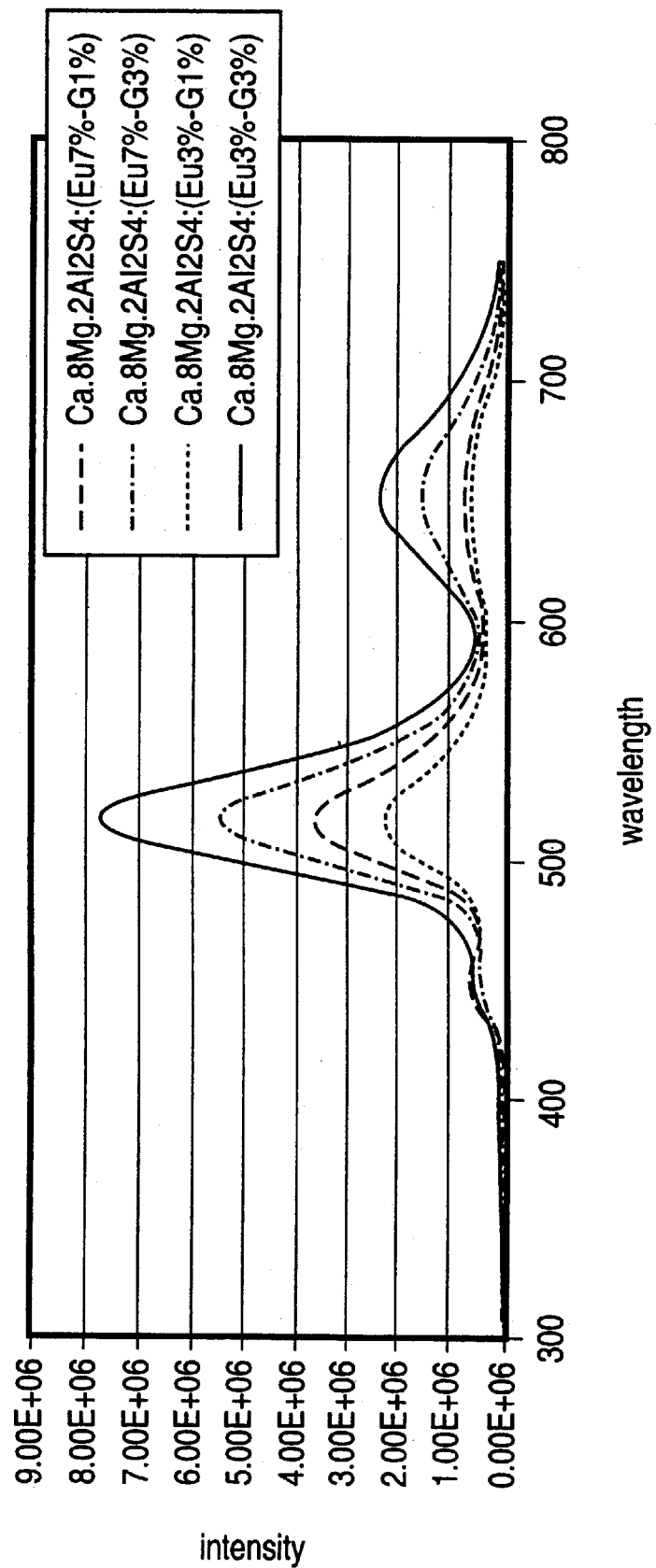
FIG. 3 is a graphical representation of photoluminescence spectra for several calcium magnesium thioaluminate powders doped with europium and co-doped with gadolinium.

The photoluminescence spectra are shown in FIG. 3. The spectra have two peaks, one at about 520 nanometers i.e. a green emission, and the other at about 660 nanometers i.e. a red emission. For the two samples with y=0.01 i.e. 1 atomic % gadolinium, the ratio of the height of the 520 nanometer peak to that of the 660 nanometer peak is about 1.5:1. For the samples with y=0.03 i.e. 3 atomic % gadolinium, the ratio of these peaks is increased to about 9:1. Thus, it is evident that an increased gadolinium content causes a suppression of the red emission relative to the green emission. This is beneficial in two respects. First, the green luminosity is increased, thereby providing a more efficient green phosphor. Secondly, a filter would not be required to eliminate red emission, thereby potentially reducing the cost of a display and eliminating attenuation of the green emission by the filter.

EXAMPLE II

Three europium-activated and gadolinium co-activated calcium thioaluminate phosphor films were formed on a thick film substrate. The thick film substrate was comprised of a 5 cm by 5 cm alumina substrate having a thickness of 0.1 cm. A gold electrode was deposited on the substrate, following which a thick film high dielectric constant dielectric layer was deposited in accordance with the methods exemplified by WO 00/70917 of Wu et al. A thin film dielectric consisting of barium titanate, with a thickness of 100–200 nanometers, was deposited on top of the thick film dielectric using the sol gel technique described in U.S. patent application Ser. No. 09/761,971.

The phosphor film was electron beam evaporated on top of the barium titanate layer using dual source electron beam evaporation according to the methods described in U.S. patent application Ser. No. 09/747,315. The two evaporation sources were aluminum sulphide and a fused mixture of calcium sulphide, europium sulphide and gadolinium fluoride. Both evaporation sources were in the form of pellets, which were prepared using the method outlined in Example I.

The phosphor deposition was carried out in a low pressure atmosphere of hydrogen sulphide at a pressure of 0.1 millitorr, and with the substrate at a temperature of 200° C. The deposition was carried out by electron beam evaporation using dual sources, one of aluminum sulphide, and the other containing the remaining constituents of the phosphor material. The deposition rate of the aluminum sulphide, as measured in the absence of the remaining constituents using a quartz crystal monitor, was 6 Angstroms per second and the deposition rate of the remaining constituents in the absence of aluminum sulphide, also as measured using a quartz crystal monitor, was 3 Angstroms per second. The deposited phosphor film thickness was 4000 Angstroms.

The first of the phosphor films had (Sample A) a europium concentration of seven atomic percent and a gadolinium concentration of zero atomic percent. The second phosphor film (Sample B) had a europium concentration of three atomic percent and a gadolinium concentration of three atomic percent. The third phosphor film (Sample C) had a europium concentration of 7 atomic percent and a gadolinium concentration of 3 atomic percent.

Following deposition, the phosphor-coated substrate was annealed under a nitrogen atmosphere at a temperature of 650° C. for 5 minutes. A 50 nanometer thick alumina thin film and an indium tin oxide transparent conductor were deposited over the phosphor to provide a second electrode.

Figure 4:
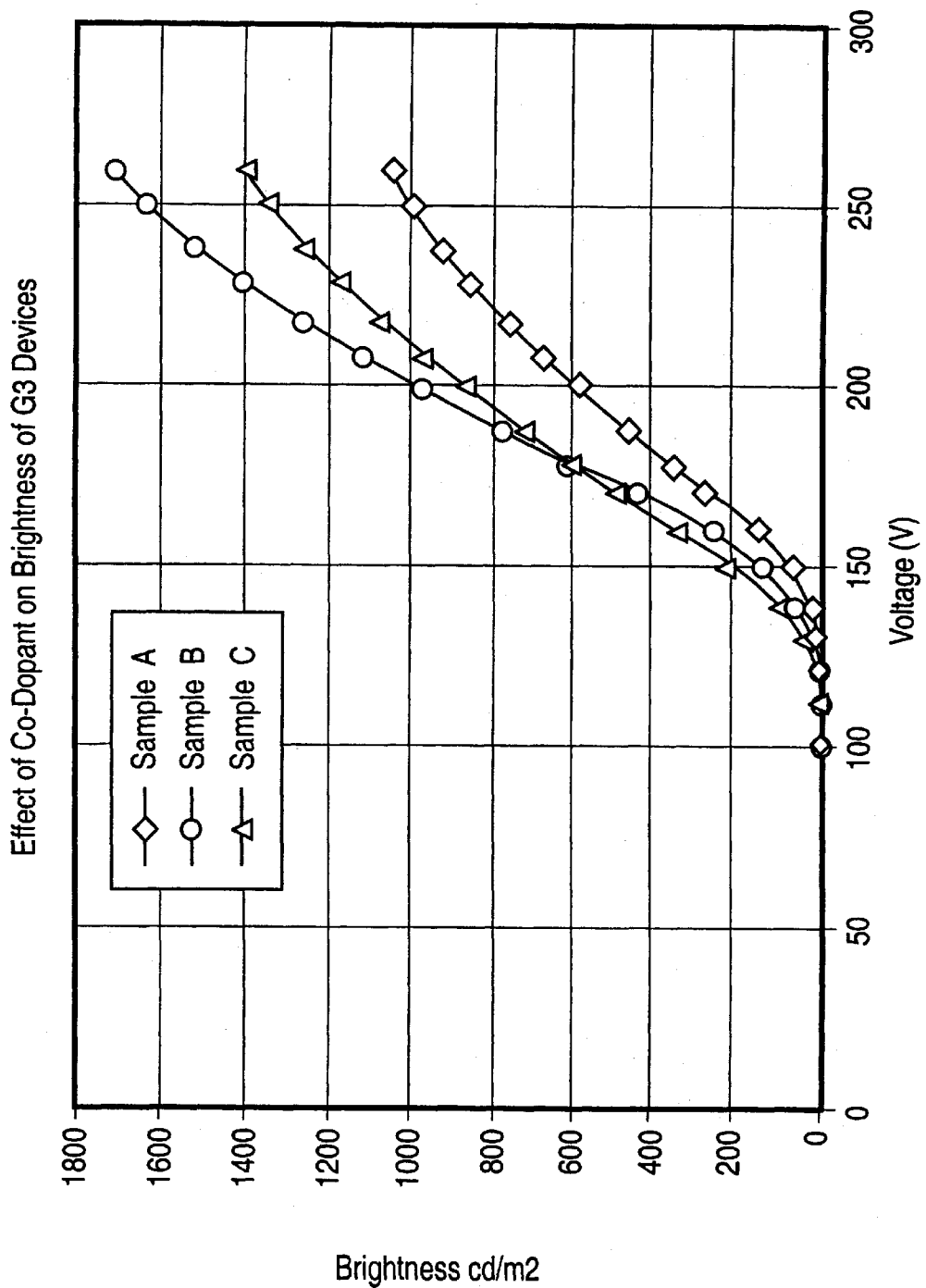
FIG. 4 is a graphical representation of luminosity as a function of applied voltage for several electroluminescent devices with calcium thioaluminate phosphors having different europium activator and gadolinium co-activator concentrations.

The resultant devices were tested using alternating polarity 32 microsecond wide square-wave pulses and a frequency of 240 Hz. The pulse amplitude was varied in increments of 10 volts up to 260 volts. The results are shown in FIG. 4.

The device with the phosphor film having seven atomic percent europium and no gadolinium showed a green emission with CIE colour coordinates of x=0.185 and y=0.634 and a maximum luminosity of about 1000 candelas per square meter. The device with the phosphor film having three atomic percent europium and three atomic percent gadolinium had similar CIE coordinates of x=0.180 and y=0.605, and a maximum luminosity of about 1400 candelas per square meter. The third substrate with a phosphor film having seven atomic percent of europium and three atomic percent of gadolinium again had similar CIE coordinates of x=0.193 and y=0.632. However, as seen in FIG. 4, the highest maximum luminosity was 1700 candelas per square meter. All devices had an optical threshold voltage, above which light is emitted, of about 120 volts and a fairly gradual onset of luminosity above the threshold voltage.

In summary, the addition of 3 atomic percent of gadolinium to a phosphor activated with seven atomic percent of europium yielded an increase in luminosity of about 70 percent. Increasing the concentration of europium from three atomic percent to seven atomic percent in the presence of three atomic percent gadolinium gave rise to a luminosity increase of about 20 percent.

EXAMPLE III

Four devices similar to those in Example II were fabricated and tested except that additional un-doped zinc sulphide layers were interposed between the phosphor film and the encapsulating dielectric layers. Two of these devices (Samples D and E) had phosphor films doped with three atomic percent europium and three atomic percent gadolinium and the remaining two devices (Samples F and G) had phosphor films doped with seven atomic percent europium and three atomic percent gadolinium. The lower zinc sulphide layer, which was adjacent to the thick film layer, had a thickness of 1000 Angstroms thick. The other (upper) zinc sulphide layer was 500 Angstroms thick. Both were deposited at a rate of 10 Angstroms per second using electron beam evaporation. The thickness of the phosphor layer was 4000 Angstroms, as in Example II.

Figure 5:
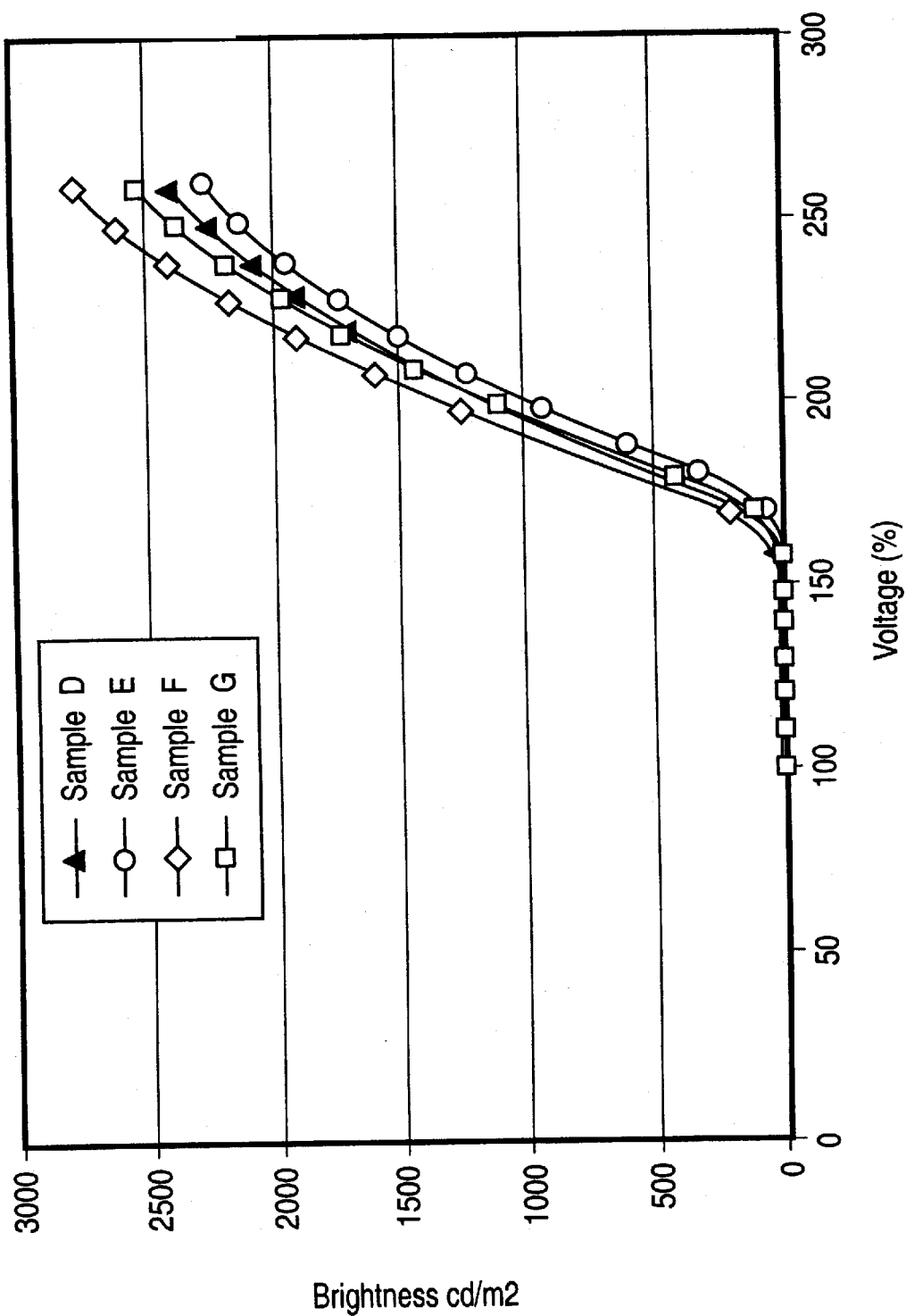
FIG. 5 is a graphical representation of luminosity of similar electroluminescent devices where the phosphor layer is sandwiched between un-doped zinc sulphide films.

The resultant devices were tested using the procedure of Example II, and the results obtained are shown in FIG. 5. The two sets of nominally identical devices had very similar behaviour. The devices with the higher europium concentration had a luminance that was about 20 percent greater than the devices with the lower europium concentration. This is consistent with the proportional improvement noted for devices with similar phosphor compositions described in Example II.

It is to be particularly noted that the devices of Example III show an overall higher luminance than the devices in Example II. The latter devices did not have zinc sulphide layers sandwiching the phosphor layer.

Comparison of the results in FIGS. 4 and 5 reveals an increase in luminance at a specified voltage and phosphor composition of about 60 percent for devices that have the zinc sulphide layers. The devices with the zinc sulphide layers also show a sharper onset of luminance above the threshold voltage, thus facilitating easier gray scale control and reduced power consumption for the display panel. While not being bound by any theory, these improvements may be related to the zinc sulphide layers acting as acceleration layers to increase the density and energy of electrons injected into the phosphor layer, thereby minimizing the thickness of the dead layer in the phosphor that does not emit light due to an insufficient density of electrons with the energy required to cause light emission.

EXAMPLE IV

In order to separate effects of performance variations caused by random or uncontrolled variation in process or fabrication conditions, luminance versus applied voltage curves for a large number of nominally identical devices with and without gadolinium co-activation were reviewed. The measurement of luminance was as described herein.

Figure 6:
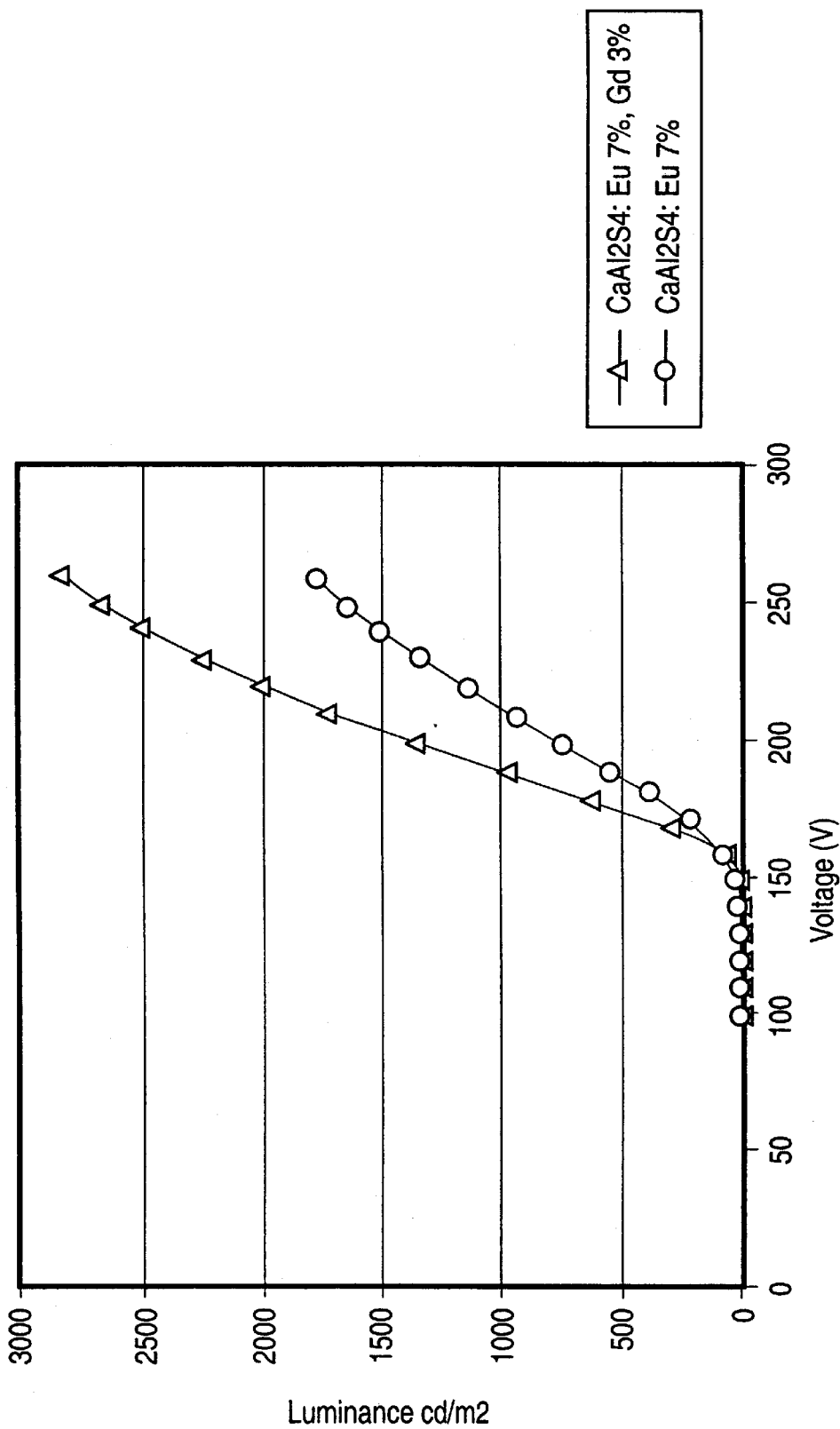
FIG. 6 is a graphical representation of luminosity of electroluminescent devices made with and made without gadolinium co-activator.

The highest luminance performance observed for the devices with and without gadolinium as co-activator is shown graphically in FIG. 6.

The results show that gadolinium co-activation provides a significant increase in luminance for a specified operating voltage.

EXAMPLE V

The efficiency, in lumens per watt of input electrical energy, was measured for devices similar to those in the previous examples.

Figure 7:
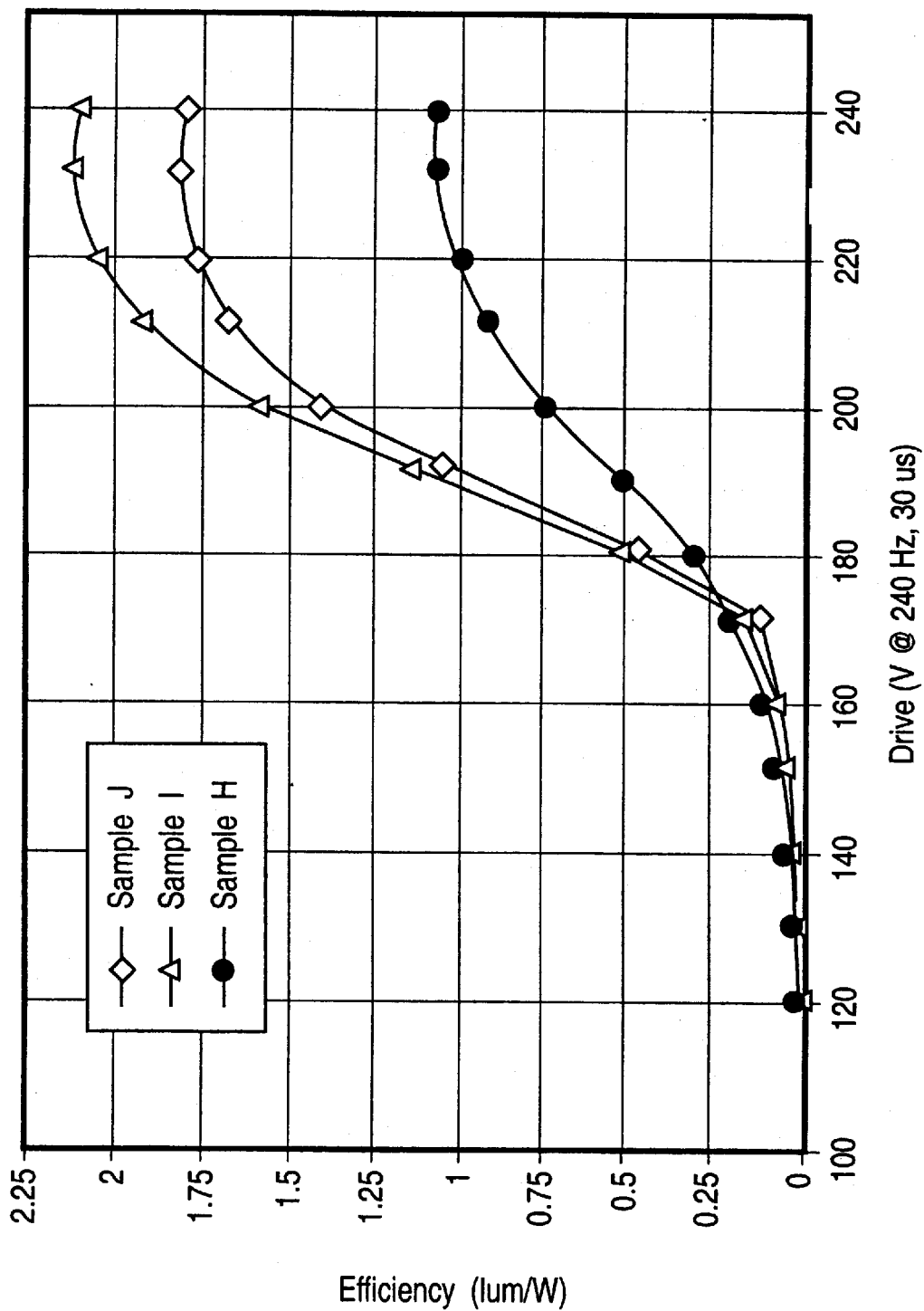
FIG. 7 is a graphical representation of energy efficiency of electroluminescent devices having different activator and co-activator concentrations.

FIG. 7 shows efficiency data for devices having phosphors with (i) seven atomic percent europium and no gadolinium (Sample H) (ii) three atomic percent europium and three atomic percent gadolinium (Sample I) and (iii) seven atomic percent europium and three atomic percent gadolinium (Sample J). The data shows that addition of three atomic percent gadolinium to devices with phosphors containing seven atomic percent europium resulted in a two fold increase in efficiency. The increase in efficiency is a reflection of the increase in luminance.

It will be noted that in this example the highest electroluminescent intensity is obtained for 7 atomic percent europium, whereas the highest photoluminescent intensity was obtained for 3 atomic percent europium. It is to be understood that the mechanisms for photoluminescence are different from those for electroluminescence. Photoluminescence likely depends significantly on the surface morphology of the samples, so this observed difference is not believed to be surprising and therefore should not be interpreted as being significant.

Figure 8:
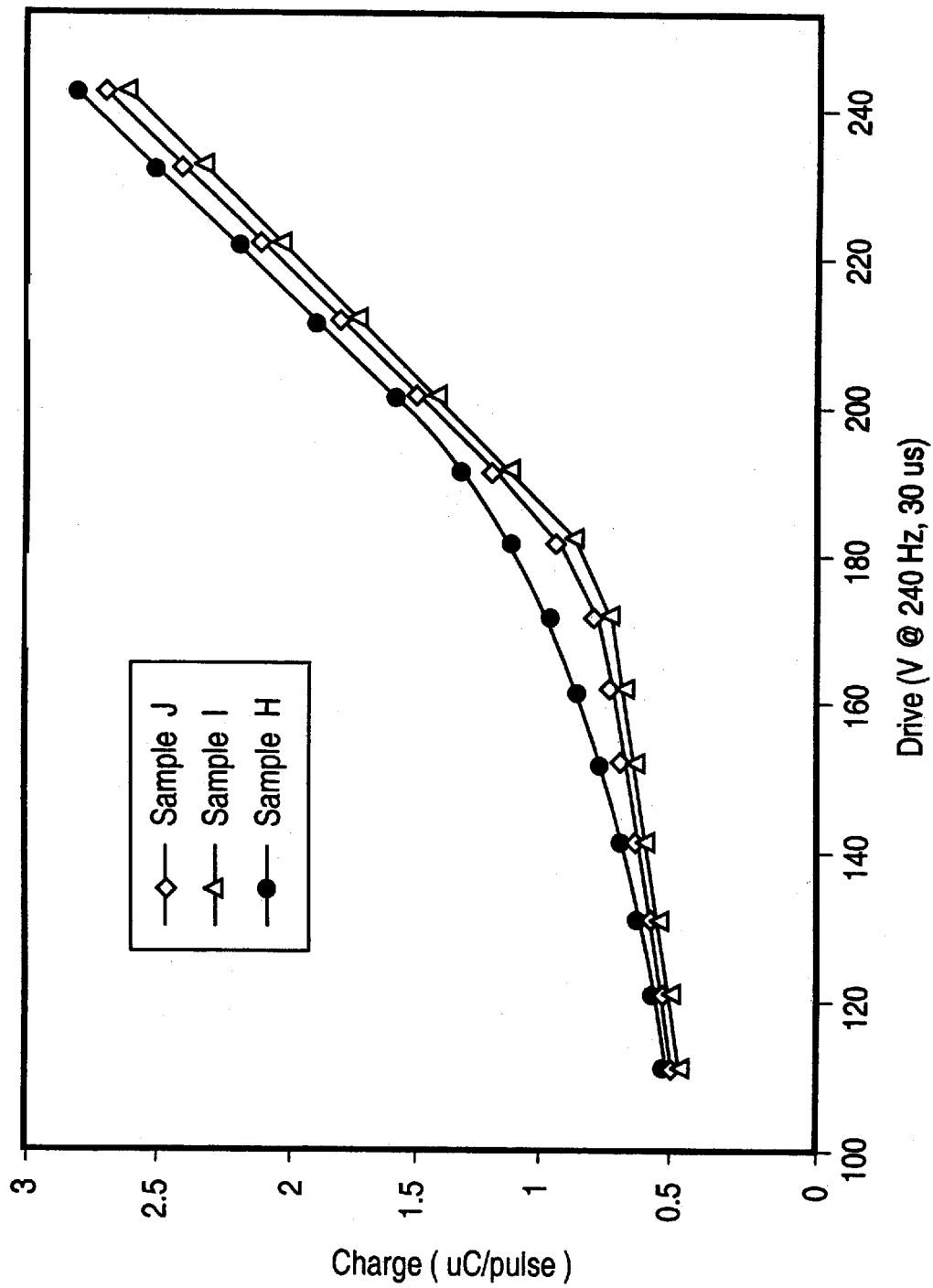
FIG. 8 is a graphical representation of charge injection as a function of applied voltage across electroluminescent devices having different activator and co-activator concentrations.

FIG. 8 shows the associated charge injection data for these devices. The injected charge was measured by applying a square-wave voltage signal having a 32 microsecond pulse width and a repetition rate of 240 Hz to the device, and measuring the resulting current using a Tektronix P6022 current probe in series with the device.

The data shows that the efficiency increase is due not only to an increase in luminance, but also to a reduction in the charge injected into the devices at a specified operating voltage.

An increase in efficiency was observed, which is a reflection of the observed increase in luminance for the samples in this example.

EXAMPLE VI

In a comparative test, a device similar to that in Example II was constructed, except that (i) gadolinium was not added and (ii) three atomic percent europium was added in the form of europium fluoride rather than europium sulphide.

It was found that there was no increase in luminosity over that for a similar device where the europium was added as europium sulfide.

This example shows that the luminosity enhancement according to the present invention is due to co-activation with gadolinium, rather than the inclusion of fluoride in the phosphor.

EXAMPLE VII

Figure 9:
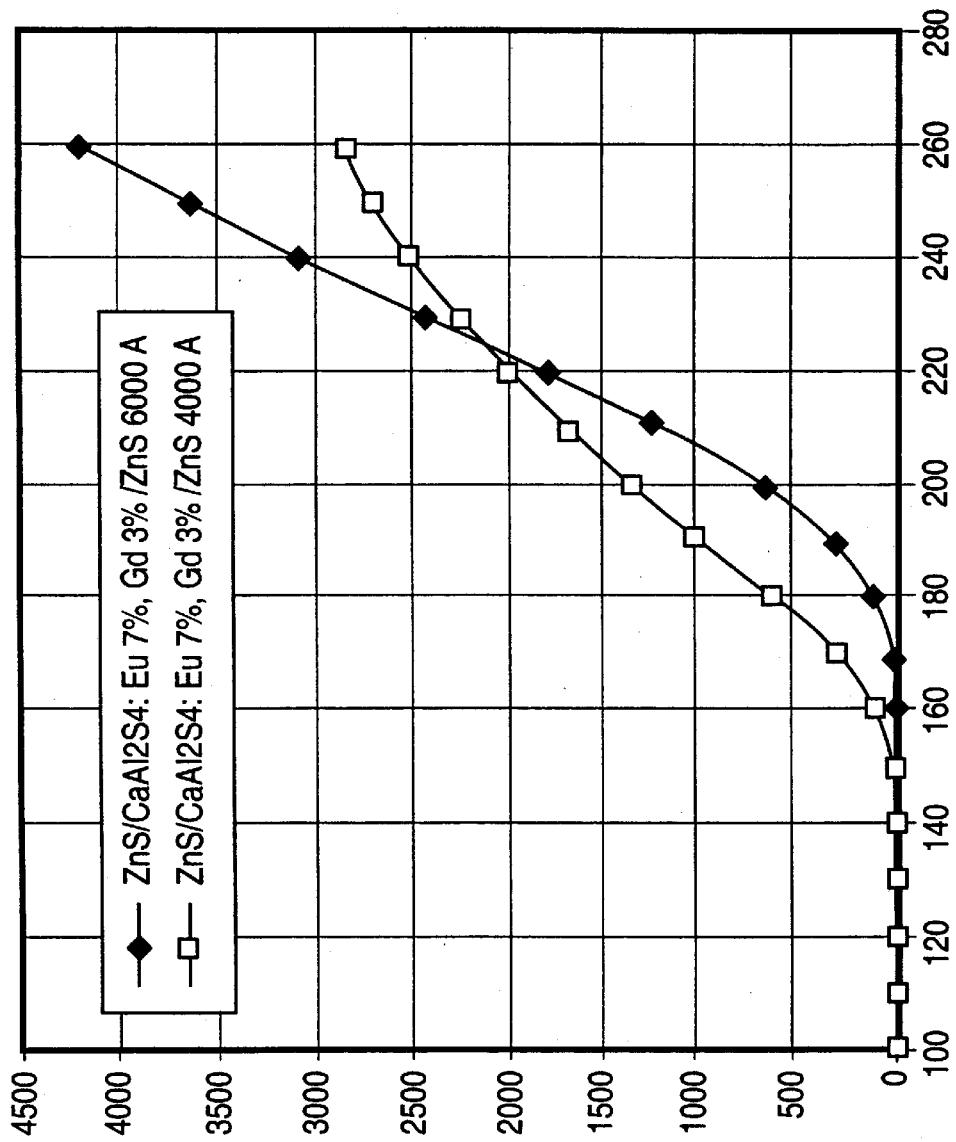
FIG. 9 is a graphical representation of the luminosity of electroluminescent devices having phosphors of different thickness.

A device with a phosphor having seven atomic percent europium and three atomic percent gadolinium and similar to that in Example III was constructed, except that the thickness of the phosphor layer was 6000 Angstroms rather than 4000 Angstroms. The comparative test results for the devices with layers with thicknesses of 6000 Angstroms and 4000 Angstroms are shown in FIG. 9.

The device with the thicker layer has a higher threshold voltage. However, the slope of the luminance against voltage curve for this device is more linear and substantially steeper, facilitating a higher ultimate luminance, compared to the device with the thinner layer. Both devices show the same luminance at about 225 volts, but the characteristics of the device with the thicker layer facilitates the use of a lower column voltage to operate a matrix addressed display. As explained in U.S. patent application Ser. No. 09/504,472, the use of lower column voltages increases the energy efficiency of matrix addressed electroluminescent displays, while ensuring that the display exhibits a high contrast ratio.

What is claimed is:

1. A thin film phosphor for an electroluminescent device, said phosphor being selected from the group consisting of thioaluminates and thioindates having at least one cation selected from elements of Groups IIA and IIB of the Periodic Table of Elements, said phosphor being activated by a rare earth metal and co-activated with gadolinium.

2. The thin film phosphor of claim 1 in which the phosphor is a thioaluminate.

3. The thin film phosphor of claim 2 in which said rare earth metal is europium or cerium.

4. The thin film phosphor of claim 3 in which the rare earth metal is europium.

5. The thin film phosphor of claim 4 in which the cation is calcium.

6. The thin film phosphor of claim 5 in which the phosphor contains europium in an amount in the range of 1 to 10 atomic percent and gadolinium in an amount in the range of 1 to 5 atomic percent.

7. The thin film phosphor of claim 6 in which the amount of europium is between 2 and 8 atomic percent and the amount of gadolinium is between 2 and 4 atomic percent.

8. An electroluminescent device comprising a thin film phosphor of claim 1 on a substrate.

9. The electroluminescent device of claim 8 in which the phosphor is a thioaluminate.

10. The electroluminescent device of claim 9 in which said rare earth metal is europium or cerium.

11. The electroluminescent device of claim 9 in which the rare earth metal is europium.

12. The electroluminescent device of claim 11 in which the cation is calcium.

13. The electroluminescent device of claim 12 in which phosphor contains europium in an amount in the range of 1 to 10 atomic percent and gadolinium in an amount in the range of 1 to 5 atomic percent.

14. The electroluminescent device of claim 13 in which the amount of europium is between 2 and 8 atomic percent and the amount of gadolinium is between 2 and 4 atomic percent.

15. The electroluminescent device of claim 8 in which the thin film phosphor is adjacent to a thin film of zinc sulphide.

16. The electroluminescent device of claim 13 in which the thin film phosphor is sandwiched between thin films of zinc sulphide.

17. The electroluminescent device of claim 15 in which the phosphor is a thioaluminate.

18. The electroluminescent device of claim 17 in which said rare earth metal is europium or cerium.

19. The electroluminescent device of claim 18 in which the rare earth metal is europium.

20. The electroluminescent device of claim 19 in which the cation is calcium.

21. The electroluminescent device of claim 20 in which phosphor contains europium in an amount in the range of 1 to 10 atomic percent and gadolinium in an amount in the range of 1 to 5 atomic percent.

22. The electroluminescent device of claim 21 in which the amount of europium is between 2 and 8 atomic percent and the amount of gadolinium is between 2 and 4 atomic percent.

23. An electroluminescent device of claim 8 further comprising a thick film dielectric layer.

24. A thin film phosphor for an electroluminescent device, said phosphor being a thioaluminate having a calcium cation, said phosphor being activated by europium and co-activated with gadolinium.

25. The thin film phosphor of claim 24 in which the phosphor contains europium in an amount in the range of 1 to 10 atomic percent and gadolinium in an amount in the range of 1 to 5 atomic percent.

26. The thin film phosphor of claim 25 in which the amount of europium is between 2 and 8 atomic percent and the amount of gadolinium is between 2 and 4 atomic percent.

27. An electroluminescent device comprising a thin film phosphor of claim 25 on a substrate.

28. The electroluminescent device of claim 27, wherein the phosphor is sandwiched between thin films of zinc sulphide.

29. An electroluminescent device of claim 27 further comprising a thick film dielectric layer.

30. A thin film phosphor for an electroluminescent device, said phosphor being a thiogallate having at least one cation selected from elements of Groups IIA and IIB of the Periodic Table where the cation is not calcium or strontium, said phosphor being activated by a rare earth metal and co-activated with gadolinium.

31. The thin film phosphor of claim 30 in which the phosphor contains europium in an amount in the range of 1 to 10 atomic percent and gadolinium in an amount in the range of 1 to 5 atomic percent.

32. The thin film phosphor of claim 31 in which the amount of europium is between 2 and 8 atomic percent and the amount of gadolinium is between 2 and 4 atomic percent.

33. An electroluminescent device comprising a thin film phosphor of claim 30 on a substrate.

34. The electroluminescent device of claim 33, wherein the phosphor is sandwiched between thin films of zinc sulphide.

35. The electroluminescent device of claim 33 further comprising a thick film dielectric layer.

* * * * *